United States Patent
Paget

(10) Patent No.: US 9,656,227 B2
(45) Date of Patent: May 23, 2017

(54) FOOD BLENDING APPLIANCE WITH WIPER ASSEMBLY

(71) Applicant: Whirlpool Corporation, Benton Harbor, MI (US)

(72) Inventor: Paul S. Paget, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 834 days.

(21) Appl. No.: 13/779,378

(22) Filed: Feb. 27, 2013

(65) Prior Publication Data

US 2014/0241109 A1 Aug. 28, 2014

(51) Int. Cl.
*A47J 43/046* (2006.01)
*B01F 15/00* (2006.01)
*A47J 43/07* (2006.01)

(52) U.S. Cl.
CPC ....... *B01F 15/00058* (2013.01); *A47J 43/046* (2013.01); *A47J 43/0465* (2013.01); *A47J 43/0716* (2013.01)

(58) Field of Classification Search
CPC ............. B01F 15/00058; A47J 43/0716; A47J 43/046; A47J 43/0465
USPC ........... 366/205, 206, 309, 312, 313; 99/348
See application file for complete search history.

(56) References Cited

U.S. PATENT DOCUMENTS

| 1,415,735 A | * | 5/1922 | Trust ..................... | B01F 7/1605 366/288 |
| 2,753,160 A | * | 7/1956 | Gunn, Sr. ............... | A47J 43/07 366/309 |
| 3,313,332 A | * | 4/1967 | Fritz ..................... | A47J 43/046 241/101.8 |
| 3,415,497 A | * | 12/1968 | Johnson .................. | A47J 43/04 15/236.01 |

(Continued)

FOREIGN PATENT DOCUMENTS

| CH | 554139 A | * | 9/1974 | ............. A23G 9/045 |
| EP | 0571349 A1 | | 11/1993 | |

(Continued)

OTHER PUBLICATIONS

European Patent No. 14154888.3 filed Feb. 12, 2014, Applicant: Whirlpool Corporation, European Search Report re: same, mailing date Apr. 15, 2014.

*Primary Examiner* — Charles Cooley
(74) *Attorney, Agent, or Firm* — Price Heneveld LLP

(57) ABSTRACT

A food blending appliance includes a housing with a motor therein. A food blending chamber having an inner wall surface is located proximate the housing. A wiper assembly is operably coupled to the motor and has a wiper blade that includes a tapered forward portion and a tapered rearward portion. The wiper blade includes an arced exterior surface that includes a radius of curvature that is substantially the same as a radius of curvature of the inner wall surface. The operable coupling between the motor and the wiper assembly can be accomplished by a magnetic drive member in the (Continued)

housing and a magnetic blade member in the wiper assembly. The operable coupling between the motor and the wiper assembly results in rotation of the wiper blade when the motor is activated, which removes food from the inner wall surface of the food blending chamber during rotation.

19 Claims, 4 Drawing Sheets

(56) References Cited

U.S. PATENT DOCUMENTS

| | | | | |
|---|---|---|---|---|
| 3,434,518 A * | 3/1969 | Motis | A47J 42/56 | 241/199.12 |
| RE27,002 E * | 12/1970 | Stephan | A47J 43/046 | 241/89.4 |
| 3,671,296 A * | 6/1972 | Funakoshi | A61J 3/005 | 118/500 |
| 3,743,192 A * | 7/1973 | Otto | B02C 18/14 | 241/101.8 |
| 3,957,215 A * | 5/1976 | Otto | A47J 43/046 | 241/282.1 |
| 4,045,185 A * | 8/1977 | Azemar | B01F 7/00416 | 366/147 |
| 4,100,612 A * | 7/1978 | Hoover | B01F 7/162 | 366/143 |
| 4,100,613 A * | 7/1978 | Shaeffer | B01F 7/162 | 220/377 |
| 4,100,615 A * | 7/1978 | Thompson | B01F 7/162 | 366/170.2 |
| 4,101,977 A * | 7/1978 | Brackman | B01F 7/162 | 241/282.1 |
| 4,101,978 A * | 7/1978 | Brackman | B01F 7/162 | 366/185 |
| 4,106,118 A * | 8/1978 | Hoover | B01F 7/162 | 241/97 |
| 4,124,310 A * | 11/1978 | Brackman | B01F 7/162 | 366/246 |
| 4,190,371 A * | 2/1980 | Durr | B01F 7/00208 | 366/139 |
| RE30,649 E * | 6/1981 | Thompson | B01F 7/162 | 366/170.2 |
| 4,380,398 A * | 4/1983 | Burgess | B01F 7/305 | 366/261 |
| 4,655,605 A * | 4/1987 | Cipelletti | B01F 7/001 | 366/149 |
| 4,854,717 A * | 8/1989 | Crane | B01F 13/002 | 366/197 |
| 4,863,278 A * | 9/1989 | Otto | A47J 43/046 | 241/282.2 |
| 4,878,627 A * | 11/1989 | Otto | A47J 43/0722 | 241/199.12 |
| 4,946,285 A * | 8/1990 | Vennemeyer | A47J 43/0711 | 366/288 |
| 5,044,763 A * | 9/1991 | Otto | A21C 1/141 | 366/309 |
| 5,106,199 A * | 4/1992 | Eckel | A23G 9/12 | 366/147 |
| 5,383,613 A * | 1/1995 | Sundquist | A47J 43/0705 | 241/166 |
| 5,556,201 A * | 9/1996 | Veltrop | B01F 7/00208 | 366/203 |
| 6,550,372 B1 * | 4/2003 | Sharples | A23L 1/0121 | 366/144 |
| 6,805,312 B2 * | 10/2004 | Capp | A47J 27/004 | 241/199.12 |
| 6,932,503 B2 * | 8/2005 | Fallowes | A47J 43/0711 | 366/309 |
| 7,451,613 B2 * | 11/2008 | Barraclough | A23G 9/08 | 222/146.6 |
| 8,425,108 B2 * | 4/2013 | Fung | A23G 9/22 | 366/221 |
| RE45,818 E * | 12/2015 | Fung | | |
| 9,375,689 B2 * | 6/2016 | Bravo | A23G 9/12 | |
| 2002/0027175 A1 * | 3/2002 | Capp | A47J 43/046 | 241/199.12 |
| 2003/0174576 A1 * | 9/2003 | Tague | B01F 7/1665 | 366/139 |
| 2008/0163768 A1 * | 7/2008 | Glucksman | A47J 43/0722 | 99/537 |
| 2012/0092953 A1 * | 4/2012 | Fung | A23G 9/22 | 366/343 |
| 2012/0294108 A1 * | 11/2012 | Dickson, Jr. | A47J 43/046 | 366/205 |
| 2013/0033958 A1 * | 2/2013 | Bravo | B01F 7/00208 | 366/272 |
| 2014/0241109 A1 * | 8/2014 | Paget | B01F 15/00058 | 366/205 |
| 2014/0299701 A1 * | 10/2014 | Zakowski | A47J 43/0716 | 241/166 |
| 2015/0003190 A1 * | 1/2015 | Pendleton | A47J 43/0711 | 366/314 |
| 2016/0045073 A1 * | 2/2016 | Kozlowski | A47J 43/0727 | 366/182.1 |

FOREIGN PATENT DOCUMENTS

| | | | | |
|---|---|---|---|---|
| FR | 2605207 A1 * | 4/1988 | | A47J 43/046 |
| GB | 2465834 A | 6/2010 | | |
| WO | 2004006744 A1 | 1/2004 | | |

* cited by examiner

FOOD BLENDING APPLIANCE WITH WIPER ASSEMBLY

BACKGROUND

The present device generally relates to a food blending appliance, and more specifically, to a food blending appliance with a wiper assembly.

SUMMARY

In one aspect, a food blending appliance includes a housing. A food blending chamber is located proximate the housing, and includes an inner wall surface. A wiper assembly has a wiper blade that includes a tapered forward portion and a tapered rearward portion. The wiper blade includes a smooth interior surface and an arced exterior surface that includes a radius of curvature that is substantially the same as a radius of curvature of the inner wall surface. A magnetic blade member is operably coupled with the wiper blade and is in magnetic communication with a magnetic drive member. A motor is disposed in the housing. The motor is operably coupled to the magnetic driver member such that activation of the motor causes the magnetic driver member and the magnetic blade member to rotate, resulting in rotation of the wiper blade, which removes food from the inner wall surface of the food blending chamber during rotation.

In another aspect, a food blending appliance includes a housing and a food blending chamber is located proximate the housing. The food blending chamber includes an inner wall surface. A wiper assembly is operably coupled to the motor and has a wiper blade that includes a tapered forward portion and a tapered rearward portion. The wiper blade includes a smooth interior surface and an arced exterior surface that is substantially the same as an arc of the inner wall surface. A motor is disposed in the housing. The motor is operably coupled to the wiper assembly such that activation of the motor causes the wiper blade of the wiper assembly to rotate within the food blending chamber.

In yet another aspect, a food blending appliance includes a housing having a motor disposed therein. A food blending chamber is located proximate the housing. The food blending chamber includes an inner wall surface. A wiper assembly includes at least one wiper blade in abutting contact with the inner wall surface of the food blending chamber. Activation of the motor causes rotation of the at least one wiper blade about a circumference of the inner wall surface, thereby removing food from contact with the inner wall surface.

These and other features, advantages, and objects of the present device will be further understood and appreciated by those skilled in the art upon studying the following specification, claims, and appended drawings.

DETAILED DESCRIPTION OF EMBODIMENTS

Figure 1:
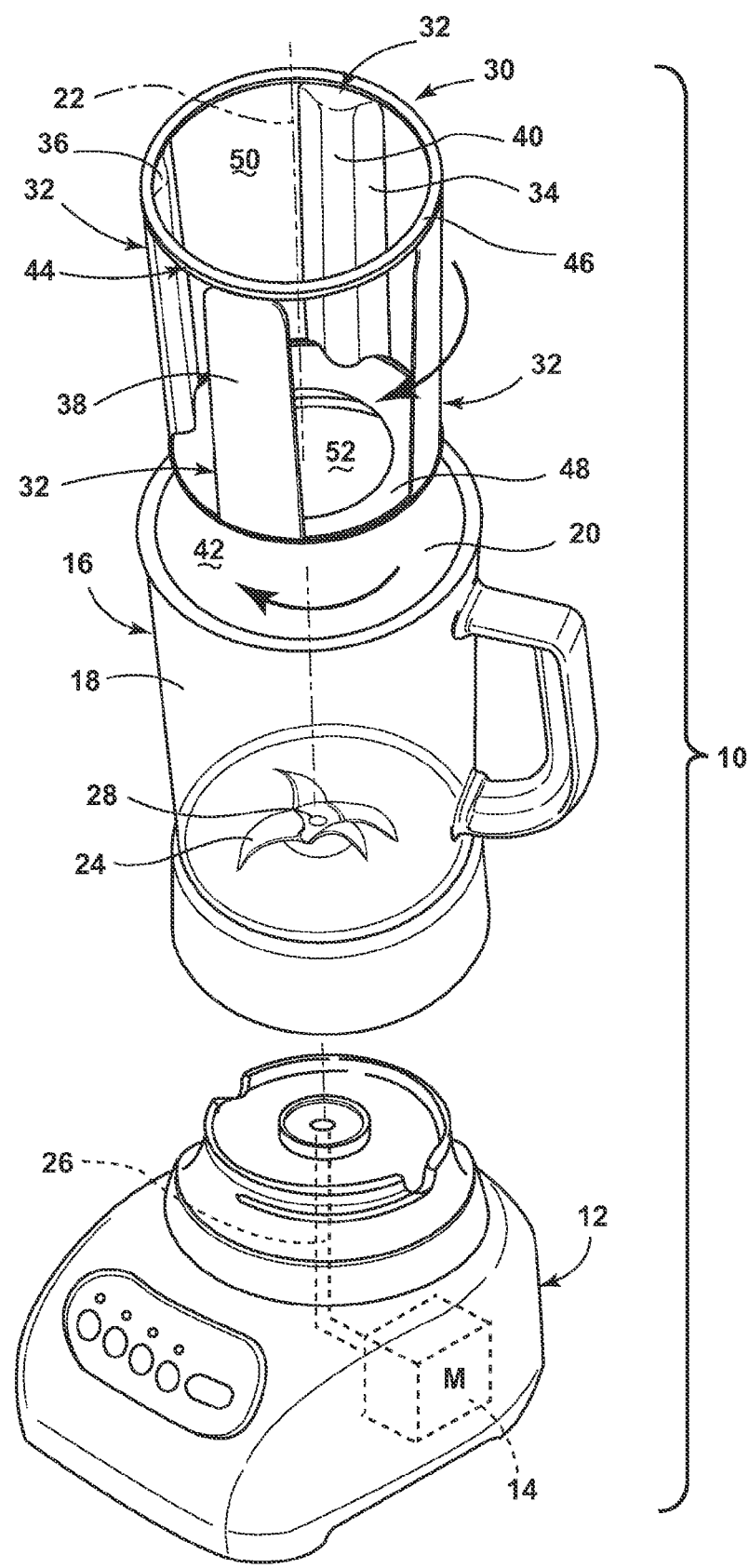
FIG. 1 is a disassembled top perspective view of a food blending appliance having a wiper blade assembly.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIG. 1, reference numeral 10 generally designates a food blending appliance, which includes a housing 12. The housing 12 includes a motor 14 disposed therein. A jar 16 containing a food blending chamber 18 is located proximate the housing 12. The food blending chamber 18 includes an inner wall surface 20. A central axis 22 extends through the food blending chamber 18 and the housing 12.

A blending device 24 is disposed within the food blending chamber 18, and is operably coupled to and rotationally driven by the motor 14 in the housing 12 when the jar 16 is installed on the housing 12. The coupling between the blending device 24 and the motor 14 may include a motor output shaft 26 and a blending device shaft 28, which is mechanically engaged therewith, such that rotation of the motor output shaft 26 drives the rotation of the blending device shaft 28, causing rotation of the blending device 24.

A wiper assembly 30 is also disposed within the food blending chamber 18, and has a wiper blade 32 that includes a tapered forward portion 34 and a tapered rearward portion 36. The wiper blade 32 includes an arced exterior surface 38 that includes a radius of curvature that is substantially the same as a radius of curvature of the inner wall surface 20. The wiper blade 32 further includes a smooth interior surface 40. The tapered forward portion 34 may specifically be shaped as an arcuate forward portion, configured to direct food from contact with a side of the inner wall surface 20 toward an interior portion 42 of the food blending chamber 18. The wiper blade 32 abuts or is disposed adjacent the inner wall surface 20 of the food blending chamber 18, allowing the wiper blade 32 to remove material from the inner wall surface 20 when rotated therein.

Referring again to FIG. 1, the wiper assembly 30 includes a frame 44 having an upper frame member 46 and a lower frame member 48 with the wiper blade 32 extending therebetween. The upper frame member 46 and the lower frame member 48 are configured to provide support for the wiper blade 32 at a top and a bottom of the wiper blade. The frame 44 can be configured for removal from the food blending chamber 18, and the wiper blade 32 may be configured for removal from the frame 44. Removal of the frame 44 from the food blending chamber 18 and of the wiper blade 32 from the frame 44 facilitates cleaning of the food blending chamber 18 and the wiper assembly 30, and allows use of the food blending appliance 10 without the wiper assembly 30, if desired. As shown in FIG. 1, a plurality of wiper blades 32 may be provided between the upper and lower frame members 46, 48, such as four wiper blades 32 spaced equidistantly around the circumference of the wiper assembly 30.

The wiper blade 32 is optionally formed from a compliant polymeric material. The use of a compliant polymeric material enables the wiper blade 32 to closely engage with the inner wall surface 20, and conform to the shape of the inner wall surface 20 to effectively remove food material therefrom.

The upper and lower frame members 46, 48 also have openings 50, 52 therethrough, to permit installation within the food blending chamber 18. The opening 52 in the lower frame member 48 permits the blending device 24 to extend therethrough, and the opening 50 in the upper frame member 46 allows for the addition of ingredients to the food blending chamber 18. In addition, a lid is generally provided to prevent food from escaping the food blending chamber 18 when the blending device 24 is activated by the motor 14.

In the embodiment shown in FIG. 1, the wiper blade 32 rotates about the circumference of the inner wall surface 20 as a result of hydrostatic rotational force imparted on the wiper blade 32 by food being blended in the food blending chamber 18 by the blending device 24. As demonstrated by the arrows, the wiper blades 32 and the blending device 24 rotate in the same direction when the hydrostatic rotational force is the driving force on the wiper blades 32.

For the remaining embodiments described below, like parts are given the same reference numerals as those shown in FIG. 1.

Figure 2:
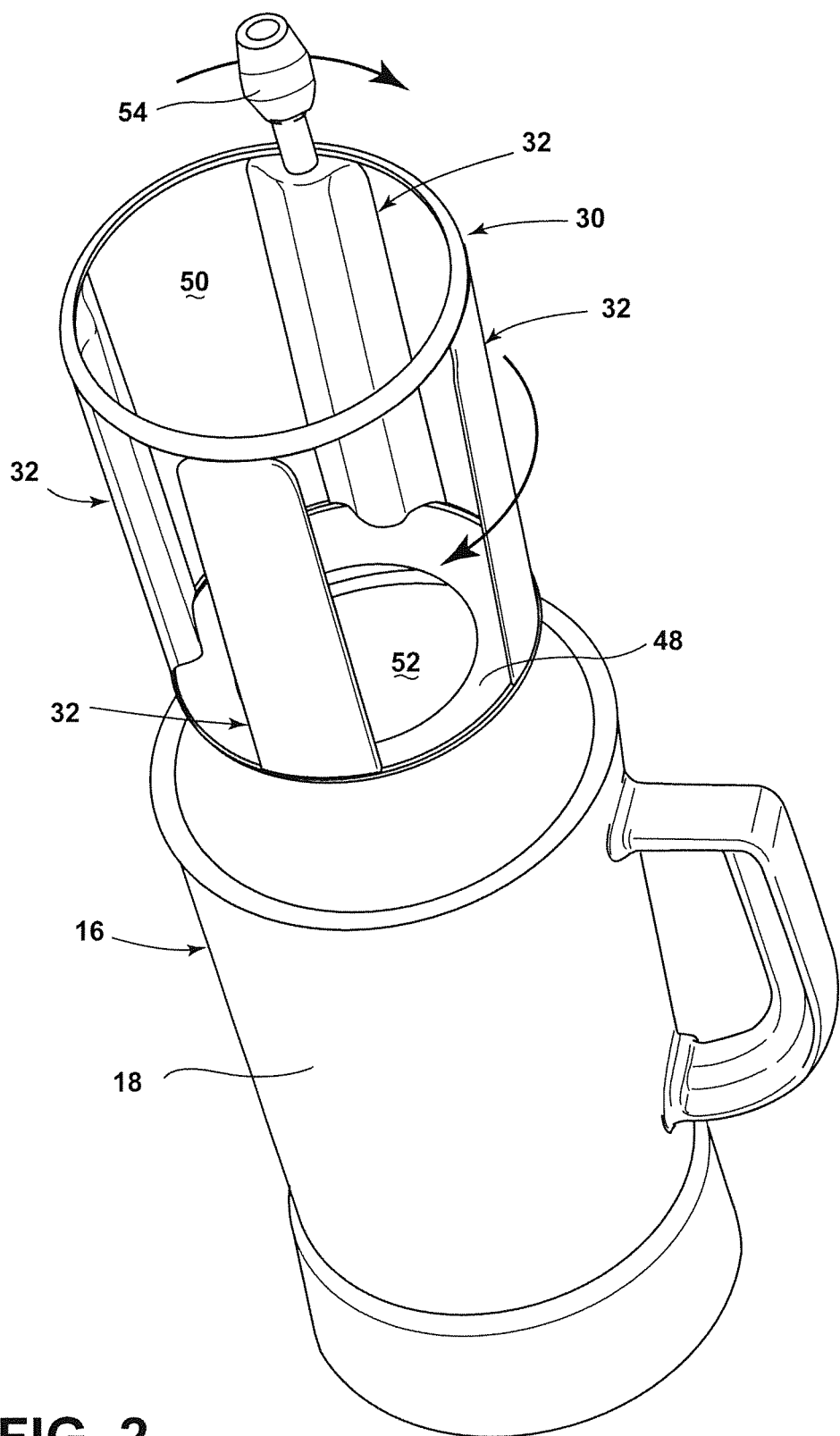
FIG. 2 is a disassembled top perspective view of another embodiment of a food blending appliance having a wiper blade assembly.

In the embodiment shown in FIG. 2, a knob 54 is operably attached to the wiper assembly 30, allowing the wiper assembly 30 to be rotated about the circumference of the inner wall surface 20 by a force applied by a user. The knob 54 may be integrally formed with the wiper blade 32 or the frame 44, or may be a separate piece mechanically fastened to the wiper assembly 30.

Figure 3:
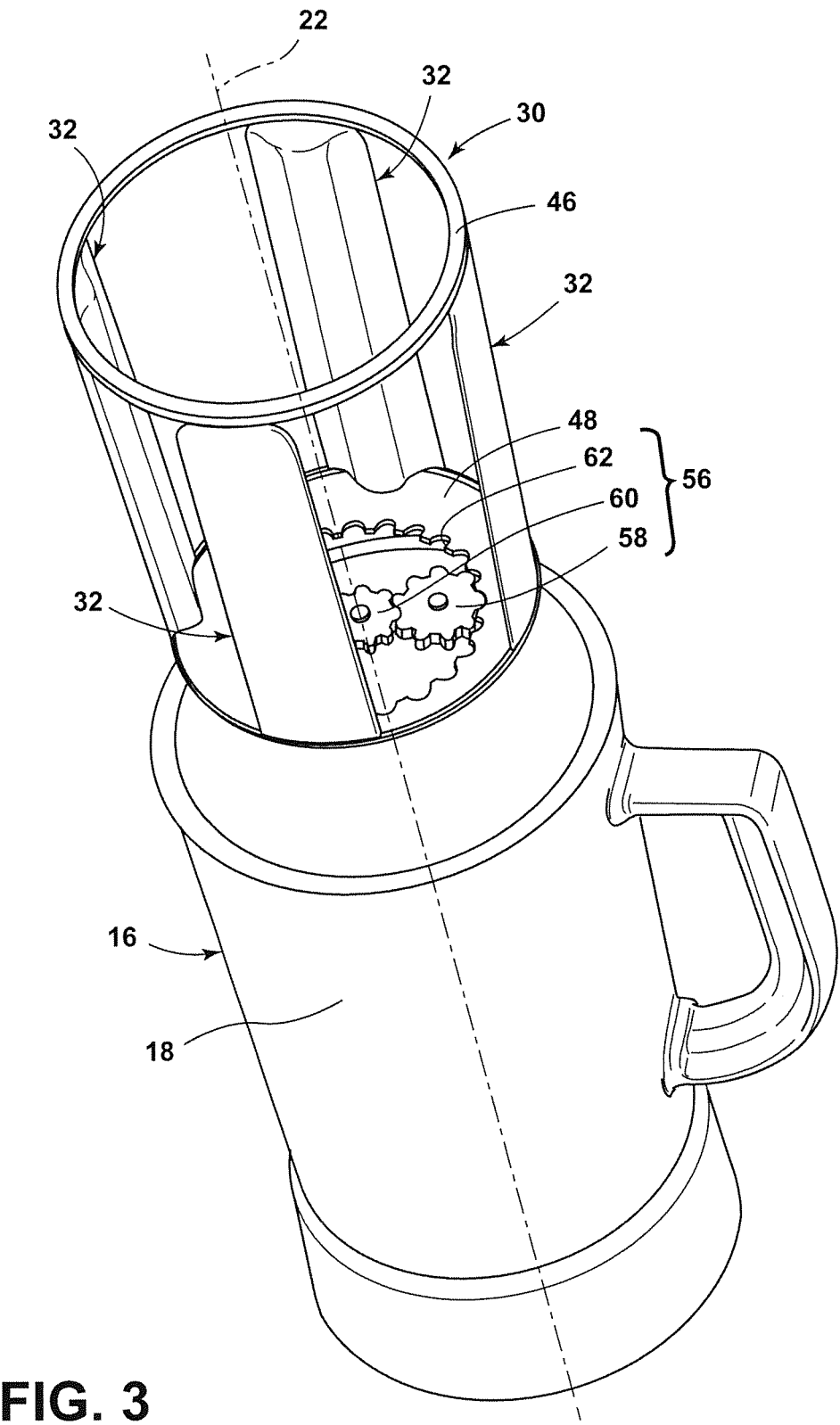
FIG. 3 is a disassembled top perspective view of another embodiment of a food blending appliance having a wiper blade assembly.

Referring now to FIG. 3, the rotation of the wiper blade 32 of the wiper assembly 30 within the food blending chamber 18 is driven by an operative coupling between the wiper assembly 30 and the motor 14 in the housing 12, such that activation of the motor 14 causes the wiper blade 32 of the wiper assembly 30 to rotate. The motor 14 is coupled to the wiper assembly 30 by a gear assembly 56. Such a gear assembly 56 includes a planetary gear 58, which is operably coupled to the wiper assembly 30, and a drive gear 60 engaged with the planetary gear 58 and operably coupled to the motor 14.

Referring again to FIG. 3, the drive gear 60 is located on the central axis 22, and may optionally be incorporated as part of the blending device shaft 28. As shown in FIG. 3, the lower frame member 48 is provided with gears 62 to interact with the planetary gear 58. The gear ratios as between the drive gear 60, the planetary gear 58, and the gears 62 can be determined so that the wiper assembly 30 is rotatable at a speed less than the output of the motor 14. Activation of the motor 14 causes rotation of the wiper blade 32 in the same rotational direction as the blending device 24, through the geared connection of the drive gear 60 and the planetary gear 58. Alternative gearing mechanisms or mechanical coupling mechanisms could be used to drive rotation of the wiper assembly 30 in the direction opposite the motor shaft 26.

Figure 4:
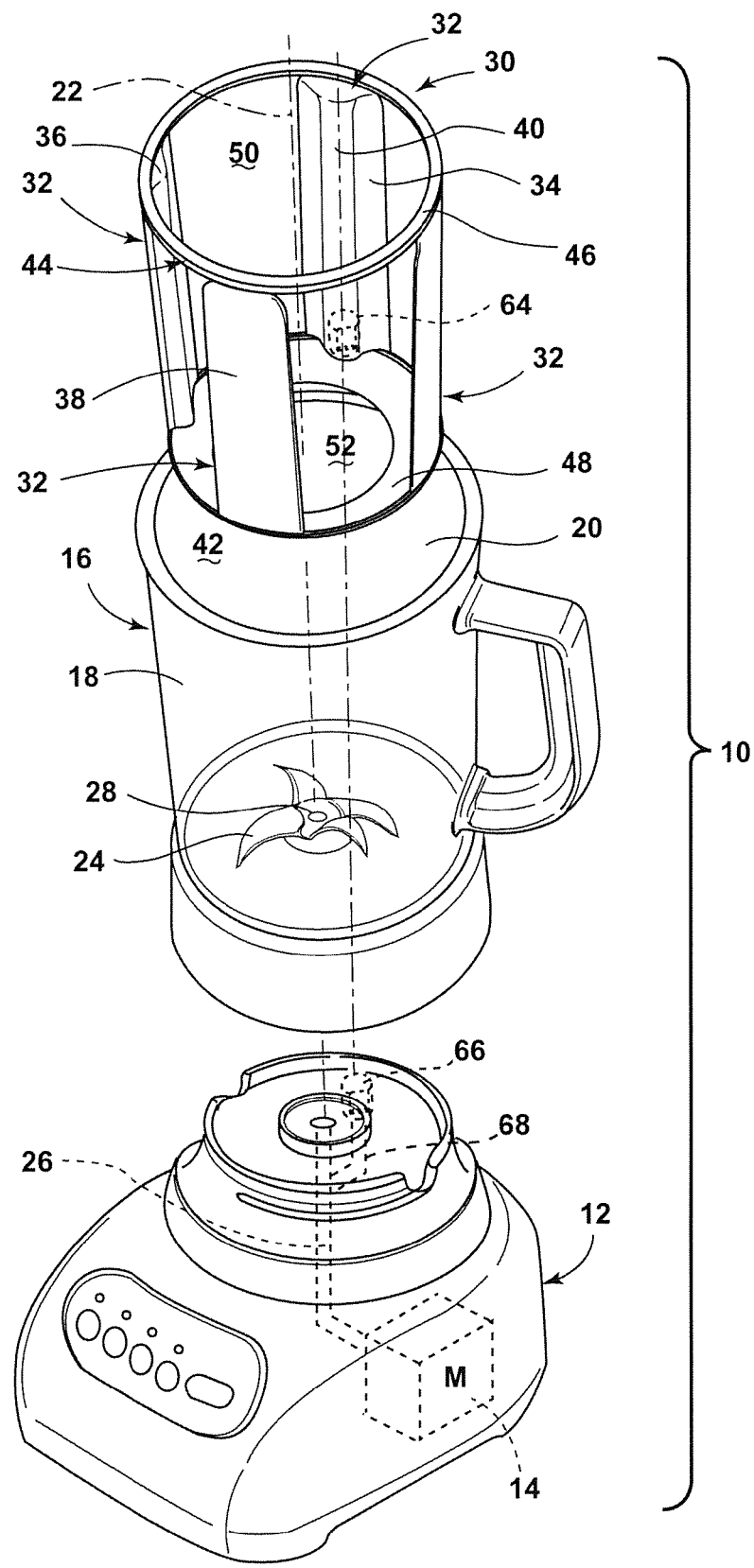
FIG. 4 is a disassembled top perspective view of another embodiment of a food blending appliance having a wiper blade assembly.

Referring now to FIG. 4, rotation of the wiper assembly 30 is driven by a magnetic drive system, including a magnetic blade member 64 and a magnetic drive member 66. The magnetic blade member 64 is operably coupled with the wiper blade 32 and is in magnetic communication with the magnetic drive member 66. The magnetic blade member 64 is fixedly physically attached to the wiper assembly 30, and has a magnetic coupling with the magnetic drive member 66. The magnetic coupling is configured so that motion of the magnetic drive member 66 is transmitted to the magnetic blade member 64, and the magnetic drive member 66 is optionally disposed at a bottom portion of the housing 12.

The motor 14 is operably coupled to the magnetic drive member 66 by a coupling member 68 such that activation of the motor 14 causes the magnetic drive member 66 and the magnetic blade member 64 to rotate, resulting in rotation of the wiper blade 32. In one embodiment, the coupling member 68 can be a gear assembly that is used to operably link the motor 14 to the magnetic drive member 66, such that the magnetic drive member 66 is rotated about the circumference of the housing 12 by the motor 14. The gear assembly used is optionally similar to that described above for rotation of the wiper assembly 30, rotating the blending device 24 and the wiper blade 32 in the same rotational direction. The magnetic coupling between the magnetic drive member 66 and the magnetic blade member 64 links the magnetic blade member 64 to the magnetic drive member 66, driving rotation of the wiper blade 30. One wiper blade 32 is molded around the magnetic blade member 64, with the magnetic blade member 64 disposed near the bottom of the wiper blade 32 and the bottom of the food blending chamber 18, allowing magnetic coupling between the magnetic blade member 64 and the magnetic drive member 66.

It will be understood by one having ordinary skill in the art that construction of the described device 10 and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A food preparation appliance comprising:
   a housing;
   a food blending chamber proximate the housing, the food blending chamber including an inner wall surface;
   a wiper assembly having a wiper blade that includes a tapered forward portion and a tapered rearward portion, wherein the wiper blade includes an arced exterior surface that includes a radius of curvature that is substantially the same as a radius of curvature of the inner wall surface;
   a magnetic blade member operably coupled with the wiper blade and in magnetic communication with a magnetic drive member; and
   a motor disposed in the housing, the motor being operably coupled to the magnetic drive member such that activation of the motor causes the magnetic drive member and the magnetic blade member to rotate, resulting in rotation of the wiper blade, which removes food from the inner wall surface of the food blending chamber during rotation.

2. The food preparation appliance of claim 1, wherein the wiper blade is molded around the magnetic blade member.

3. The food preparation appliance of claim 1, wherein the magnetic drive member is disposed at a bottom portion of the housing.

4. The food preparation appliance of claim 1, wherein the wiper blade is formed from a compliant polymeric material.

5. The food preparation appliance of claim 1, comprising:
   a blending device operably coupled with the motor, wherein activation of the motor causes rotation of the blending device and the wiper blade in the same rotational direction.

6. A food preparation appliance comprising:
   a housing;
   a food blending chamber proximate the housing, the food blending chamber including an inner wall surface;
   a wiper assembly operably coupled to the motor and having a wiper blade that includes a tapered forward portion and a tapered rearward portion, wherein the wiper blade includes a smooth interior surface and an arced exterior surface that is substantially the same as an arc of the inner wall surface; and
   a motor disposed in the housing, the motor being operably coupled to the wiper assembly through a magnetic drive member in the housing that is operably coupled to the motor and is in magnetic communication with a magnetic blade member in the wiper assembly such that activation of the motor causes the wiper blade of the wiper assembly to rotate within the food blending chamber.

7. The food preparation appliance of claim 6, wherein the motor is operably coupled to the magnetic drive member by a gear assembly.

8. The food preparation appliance of claim 7, wherein the gear assembly includes a gear operably coupled to the magnetic drive member, a drive gear operably coupled to the motor, and a planetary gear that operably couples the gear to the drive gear.

9. The food preparation appliance of claim 6, wherein the wiper assembly includes a frame configured to support a top and a bottom of the wiper blade.

10. The food preparation appliance of claim 9, wherein the frame is configured for removal from the food blending chamber, and wherein the wiper blade is configured for removal from the frame.

11. The food preparation appliance of claim 6, wherein the wiper blade includes an arcuate forward portion configured to direct food from contact with a side of the inner wall surface toward an interior portion of the food blending chamber.

12. A food preparation appliance comprising:
    a housing including a motor disposed therein;
    a food blending chamber proximate the housing, the food blending chamber including an inner wall surface;
    a wiper assembly including at least one wiper blade in abutting contact with the inner wall surface of the food blending chamber, wherein activation of the motor causes rotation of the at least one wiper blade about a circumference of the inner wall surface, thereby removing food from contact with the inner wall surface;
    a magnetic drive member operably coupled with the motor; and
    a magnetic blade member operably coupled with the at least one wiper blade and in magnetic communication with the magnetic drive member.

13. The food preparation appliance of claim 12, comprising:
    a blending device operably coupled with the motor, wherein activation of the motor causes rotation of the blending device.

14. The food preparation appliance of claim 12, wherein the at least one wiper blade includes a tapered forward portion and a tapered rearward portion.

15. The food preparation appliance of claim 12, comprising:
    a gear assembly that operably couples the motor to the magnetic drive member.

16. The food preparation appliance of claim 12, wherein the wiper blade includes a smooth interior surface and an arced exterior surface that includes a radius of curvature that is substantially the same as a radius of curvature of the inner wall surface.

17. The food preparation appliance of claim 12, wherein the magnetic drive member is operably coupled to the motor such that activation of the motor causes the magnetic drive member and the magnetic blade member to rotate, resulting in rotation of the wiper blade, which removes food from the inner wall surface of the food blending chamber during rotation.

18. The food preparation appliance of claim 12, wherein the at least one wiper blade includes four wiper blades disposed equidistantly around the inner wall of the food blending chamber.

19. The food preparation appliance of claim 12, wherein the wiper assembly includes a frame configured to support a top and a bottom of the wiper blade.

* * * * *